March 31, 1953     J. W. MILLINGTON     2,633,016
APPARATUS FOR MEASURING VISCOSITY Filed Aug. 29, 1947     2 SHEETS—SHEET 2

INVENTOR.
John W. Millington
BY
Busser & Hardey
ATTORNEYS

Patented Mar. 31, 1953

2,633,016

UNITED STATES PATENT OFFICE 2,633,016

APPARATUS FOR MEASURING VISCOSITY

John W. Millington, Beaumont, Tex., assignor to Sun Oil Company, Philadelphia, Pa., a corporation of New Jersey Application August 29, 1947, Serial No. 771,177

2 Claims. (Cl. 73—59)

This invention relates to methods and apparatus for the making of physical measurements and has particular reference to the making of measurements in bore holes though, as will be evident hereafter, the various features of the invention are applicable to the making of physical measurements in general, including laboratory or industrial measurements.

In accordance with the invention liquid viscosity may be measured continuously while the recording instrument is lowered into a bore hole, or the tubing of a producing well, so as to make possible a continuous study of the conditions being encountered.

One object of the invention is the provision of improved means for making viscosity measurements, particularly at remote points, with transmission of these measurements to an observer.

This general object of the invention, together with other objects relating to features of transmission and the like, will become apparent from the following description read in conjunction with the accompanying drawings in which:

Figure 3 is an axial sectional view illustrating the construction of a transducer for the continuous monitoring of a flowing fluid.

In order to provide a measurement of viscosity an oscillator 52 supplies a bridge consisting of resistors 54 and 56 and the coil in each of a pair of transducers 58 and 60, each of which may be of a type which will now be described.

Figure 2:
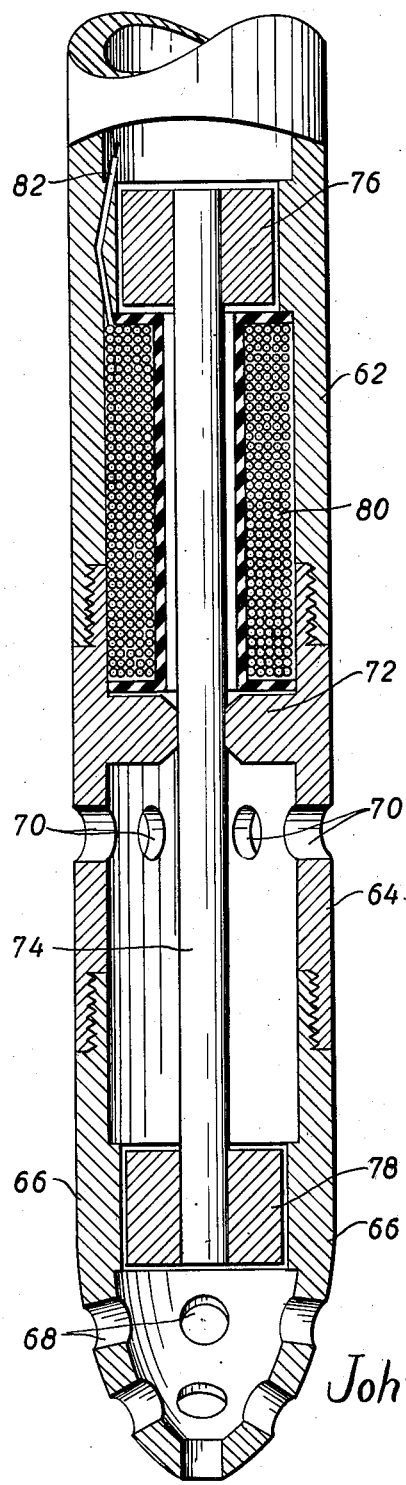
Figure 2 is an axial sectional view illustrating the construction of a transducer involved in viscosity measurements.

Figure 2 illustrates one of these transducers, for example, the transducer 60 which receives liquid from the well. This transducer comprises housing sections 62, 64 and 66, the last of which is provided with openings 68 while the section 64 is provided with openings 70 for the flow of the well fluid. This fluid may consist of liquid or gas or a mixture of liquid and gas. Figure 2 illustrates the transducer with a rounded nose such as provided if it were used alone. It will, of course, be understood that if this element is located above some lower element the rounded nose would be replaced by a coupling provided with openings such as 68.

To an internally directed flange 72 there is secured by silver soldering or other means providing a liquid tight connection the center of a rod 74 of nickel or other material having magnetostriction properties, i. e., subject to change of dimension with variation of a magnetic field passing through it. At its upper end the rod carries a member 76 of magnetic material having small clearance with the interior of the section 62 which as well as the section 64, is also of magnetic material such as steel. A coil 80 surrounds the rod 74 as illustrated and a magnetic circuit is thus provided through the member 62, the member 64 and its internal flange 72, the upper end of the rod 74 and the member 76. Current from the bridge thus provides a varying magnetic flux which produces longitudinal vibration in the rod 74. To the lower end of the rod 74 there is secured a piston 78 having slight clearance with the walls of the section 66 of the casing. Leads 82 from the coils 80 connect to the bridge.

The mechanical oscillating system consists of the rod 74, the piston 78 and the member 76. The oscillations are variably damped depending upon the nature of the fluid surrounding the piston and consequently the transducer presents in the bridge a variable impedance depending upon the nature of the bore hole fluid.

The second transducer 58 may be identical in construction except that it is not provided with openings such as 68 and 70 and contains a permanent body of fluid, such as an oil, thereby constituting a fixed impedance acting as a reference for the variations of impedance of the transducer 60. The unbalance of the bridge and the direction of unbalance will be a measure of the viscosity of the fluid in the hole.

The output of the bridge is fed to apparatus indicated at 44 comprising an amplifier, rectifier and filter of conventional type delivering a direct potential output to control the reactance of a reactance tube circuit also of conventional type indicated at 46. This reactance tube circuit forms the variable reactance of a frequency modulated oscillator of conventional type indicated at 48. Such an oscillator may be of the type illustrated in the application of Alfred C. Winterhalter, Serial No. 656,803, filed March 25, 1946, now abandoned, and described also in the article "Frequency Modulation of Resistance Capacity Oscillators" by Maurize Artz in the Proceedings of the IRE, July 1944. The apparatus comprising the parts 44, 46 and 48 functions in conventional fashion to provide frequency modulation of a carrier which may be of audio or higher frequency. As will be evident, the output delivered through the lines 86 will consist of a carrier frequency modulated in accordance with the viscosity by reason of the degree of unbalance of the bridge effected with variation of position of the armature 76. The frequency modulated output may be transmitted to the surface in various ways. Under conditions in which it is feasible to provide a transmission line the output current may be transmitted directly through such line to the surface where a suitable demodulator of conventional nature will give rise to a direct current output which may be calibrated in terms of pressure. Alternatively, sound vibrations may be set up at a frequency modulated audio frequency for transmission as sound along a drill stem or along a supporting wire line. As a further alternative the frequency modulated output at 86 may be used to modulate an ultra high frequency wave transmitted through a drill stem or other tubing constituting a wave guide. In any case, suitable apparatus of conventional type at the surface may be used to retranslate the signal to give rise through demodulation to a direct output which will be a function of the viscosity.

It may be remarked that frequency modulation is desirable because an attempt to use amplitude modulation would give rise to difficulties in view of variable transmission losses at different depths of operation.

If a cable is used the direct potential supplies necessary for the apparatus at the bottom of the hole may be provided through the cable from the surface, the same cable transmitting the signals as alternating currents. When a cable is not used, or even if a cable is used, batteries may supply the apparatus at the bottom of the hole which may operate at low power levels using miniature tubes of low power consumption.

While the foregoing apparatus is particularly applicable to measurements in a bore hole of the type indicated it will, of course, be evident that the bridge systems and their associated apparatus may be used for similar measurements in the laboratory or in industry for control or recording or indicating purposes. In particular, the viscosity measuring system is useful in that it gives rise to an electrical output constituting a function of viscosity, which output may be used for control purposes or for control of recording or indicating apparatus of conventional types. The control which is effected, for example, may be used to modify the flow of blending constituents or the like.

Figure 1:
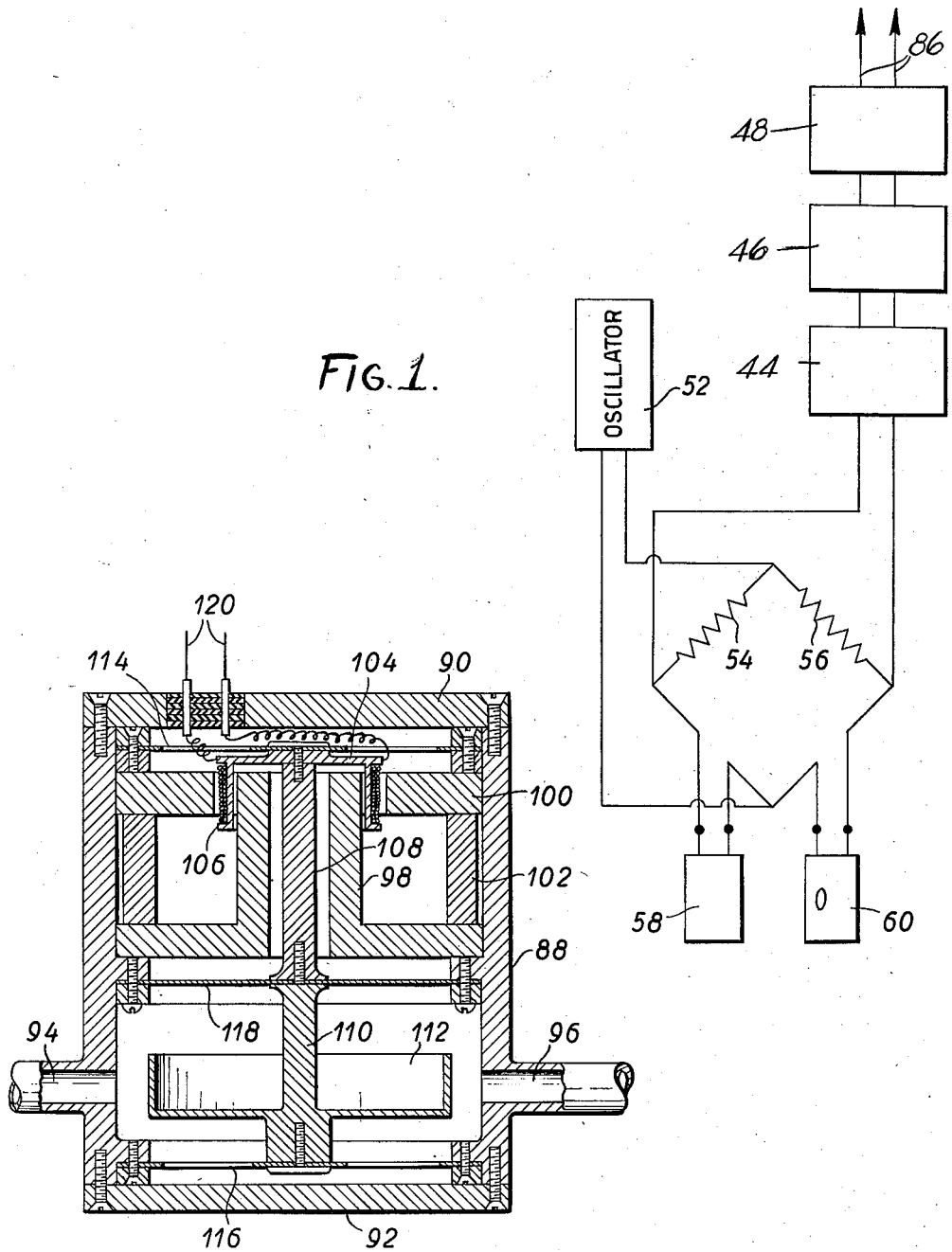
Figure 1 is a wiring diagram illustrating apparatus for the measurement of viscosity.

There is indicated in Figure 3 a transducer of a type differing from that of Figure 2. Specifically, this is illustrated as a transducer such as might be used in a laboratory or in industrial measurements of viscosity. This transducer comprises a housing 88 of non-magnetic material provided with covers 90 and 92 and with inlet and outlet connections respectively illustrated at 94 and 96. Within the casing is a member 98 of magnetic material which, together with a plate 100 of magnetic material and a cylindrical permanent magnet 102 provides a field having a gap receiving a coil 106 wound on a core 104. A pair of coupled rods 108 and 110 are connected to the carrier 104, the last rod 110 being provided with a piston indicated at 112. The movable assembly thus provided is mounted by flexible spiders 114 and 116 for axial vibration. A flexible diaphragm 118 segregates the fluid chamber beneath it from the upper region of the housing containing the magnetic field members and the coil. Leads 120 are provided to connect the coil 106 in a bridge such as indicated in Figure 1. As will be evident, there is in Figure 3, as in Figure 2, a vibrating system having an apparent impedance viewed from the connection 120 which depends upon the viscosity of the fluid in the chamber surrounding the piston 112. A similar transducer may be provided in another arm of the bridge for reference purposes, this reference transducer being permanently filled with a liquid of desired property. It will be evident that the moving coil type of transducer just described may be used in a bore hole as well as that illustrated in Figure 2 although in such case, due to the high pressures, the diaphragm 118 would be omitted which means that the bore hole fluid would surround all of the moving parts.

The magnetostriction transducer is thus more desirable since the bore hole fluid may be isolated from the coil.

When used in a bore hole for the determination of viscosity of a drilling mud the viscosity responsive apparatus may control a signal device to give warning when the viscosity falls outside desired limits. Whether used in a bore hole or otherwise, it is desirable that the reference transducers should be filled with a fluid having the same viscosity-temperature characteristics as the fluid to be measured so that the response of the system is to viscosity changes alone.

It will be evident from the above that the invention is applicable quite generally and accordingly it is to be understood that it is not limited except in accordance with the following claims.

What I claim and desire to protect by Letters Patent is:

1. Apparatus for the measurement of viscosity comprising a housing, a driving coil contained within the housing, a rod of magneto-strictive material disposed within the coil and having a portion projecting beyond the coil, said rod being anchored intermediate its ends to said housing and sealed against liquid entering the portion of the housing containing the coil, the free end of said projecting portion of said rod being provided with a piston, and the housing including a portion surrounding said piston for presenting the test liquid therebetween, said rod being mounted to be oscillated by current through said coil, an impedance bridge including said coil in one of its arms, means for energizing said bridge with alternating current, and means for measuring the unbalance of said bridge as a measurement of damping action on oscillations of said element by the viscosity of the liquid.

2. Apparatus for the measurement of viscosity comprising a tubular housing, a driving coil contained within the housing, a rod of magnetostrictive material disposed within the coil and having a portion projecting beyond the coil, said rod being anchored intermediate its ends to said housing and sealed against liquid entering the portion of the housing containing the coil, the free end of said projecting portion of said rod being provided with a piston, and the housing including an extension having a portion surrounding said piston for presenting a film of the test liquid therebetween, said rod being mounted to be oscillated by current through said coil, an impedance bridge including said coil in one of its arms, means for energizing said bridge with alternating current, and means for measuring the unbalance of said bridge as a measurement of damping action on oscillations of said element by the viscosity of the liquid.

JOHN W. MILLINGTON.

REFERENCES CITED

The following references are of record in the file of this patent:

UNITED STATES PATENTS

| Number | Name | Date |
|---|---|---|
| 1,832,901 | Harrison | Nov. 24, 1931 |
| 2,142,854 | La Pierre | Jan. 3, 1939 |
| 2,315,127 | Mounce | Mar. 30, 1943 |
| 2,340,507 | Bjork | Feb. 1, 1944 |
| 2,340,992 | Siegel | Feb. 8, 1944 |
| 2,396,420 | Hayward, et al. | Mar. 12, 1946 |
| 2,412,575 | Frosch | Dec. 17, 1946 |
| 2,422,806 | Silverman et al. | June 24, 1947 |
| 2,425,868 | Dillon | Aug. 19, 1947 |